(12) United States Patent
Gorsetman et al.

(10) Patent No.: US 7,643,512 B2
(45) Date of Patent: Jan. 5, 2010

(54) CASCADED LINKS WITH ADAPTIVE CODING AND MODULATION

(75) Inventors: Yoram Gorsetman, Ramat Hasharon (IL); Ran Sofer, Tel Mond (IL); Jonathan Friedmann, Tel Aviv (IL)

(73) Assignee: Provigent Ltd., Herzliya (IL)

( * ) Notice: Subject to any disclaimer, the term of this patent is extended or adjusted under 35 U.S.C. 154(b) by 535 days.

(21) Appl. No.: 11/479,050

(22) Filed: Jun. 29, 2006

(65) Prior Publication Data
US 2008/0002581 A1    Jan. 3, 2008

(51) Int. Cl.
*H04J 3/22* (2006.01)

(52) U.S. Cl. ....................................... 370/468

(58) Field of Classification Search ........................ None
See application file for complete search history.

(56) References Cited

U.S. PATENT DOCUMENTS

| | | | |
|---|---|---|---|
| 4,310,813 A | 1/1982 | Yuuki et al. |
| 4,321,705 A | 3/1982 | Namiki |
| 4,367,555 A | 1/1983 | Namiki et al. |
| 4,438,530 A | 3/1984 | Steinberger |
| 4,479,258 A | 10/1984 | Namiki |
| 4,557,330 A | 12/1985 | Russell et al. |
| 4,575,862 A | 3/1986 | Tahara et al. |
| 4,606,054 A | 8/1986 | Amitay et al. |
| 4,631,734 A | 12/1986 | Foschini |
| 4,644,562 A | 2/1987 | Kavehrad et al. |
| 4,688,235 A | 8/1987 | Tahara et al. |
| 4,761,784 A | 8/1988 | Srinivasagopalan et al. |
| 4,857,858 A | 8/1989 | Tahara |
| 4,910,468 A | 3/1990 | Ohtsuka et al. |
| 4,914,676 A | 4/1990 | Iwamatsu et al. |
| 4,992,798 A | 2/1991 | Nozue et al. |
| 5,023,620 A | 6/1991 | Matsuura |
| 5,068,667 A | 11/1991 | Mizoguchi |
| 5,075,697 A | 12/1991 | Koizumi et al. |

(Continued)

FOREIGN PATENT DOCUMENTS

EP    1365519 A1    11/2003

(Continued)

OTHER PUBLICATIONS

American National Standard T1.105-2001, "Synchronous optical network (SONET)—basic description including multiplex structure, rates and format", Alliance for Telecommunications Industry Solutions, 2001.

(Continued)

*Primary Examiner*—Kwang B Yao
*Assistant Examiner*—Alex Skripnikov
(74) *Attorney, Agent, or Firm*—D. Kligler I.P. Services Ltd

(57) ABSTRACT

A communication system includes a first communication unit, which is arranged to communicate with a remote communication system over a first communication link having a first, variable data rate. A second communication unit is arranged to exchange data with the remote communication system by communicating with the first communication unit over a second communication link having a second data rate. The first and second communication units are arranged to modify the second data rate responsively to variations in the first data rate, so as to match the second data rate to the first data rate.

39 Claims, 3 Drawing Sheets

U.S. PATENT DOCUMENTS

| | | |
|---|---|---|
| 5,241,320 A | 8/1993 | Mizoguchi |
| 5,247,541 A | 9/1993 | Nakai |
| 5,311,545 A | 5/1994 | Critchlow |
| 5,311,546 A | 5/1994 | Paik et al. |
| 5,383,224 A | 1/1995 | Mizoguchi |
| 5,406,589 A | 4/1995 | Iwamatsu et al. |
| 5,432,522 A | 7/1995 | Kurokami |
| 5,471,508 A | 11/1995 | Koslov |
| 5,495,502 A | 2/1996 | Andersen |
| 5,524,027 A | 6/1996 | Huisken |
| 5,541,951 A | 7/1996 | Juhasz et al. |
| 5,541,955 A | 7/1996 | Jacobsmeyer |
| 5,631,896 A | 5/1997 | Kawase et al. |
| 5,710,799 A | 1/1998 | Kobayashi |
| 5,727,032 A | 3/1998 | Jamal et al. |
| 5,742,646 A | 4/1998 | Woolley et al. |
| 5,838,224 A | 11/1998 | Andrews |
| 5,838,740 A | 11/1998 | Kallman et al. |
| 5,844,950 A | 12/1998 | Aono et al. |
| 5,901,343 A | 5/1999 | Lange |
| 5,905,574 A | 5/1999 | Vollbrecht et al. |
| 5,920,595 A | 7/1999 | Iwamatsu |
| 5,940,453 A | 8/1999 | Golden |
| 5,987,060 A | 11/1999 | Grenon et al. |
| 6,215,827 B1 | 4/2001 | Balachandran et al. |
| 6,236,263 B1 | 5/2001 | Iwamatsu |
| 6,252,912 B1 | 6/2001 | Salinger |
| 6,418,164 B1 | 7/2002 | Endres et al. |
| 6,466,562 B1 * | 10/2002 | Yoshida et al. ............... 370/336 |
| 6,501,953 B1 * | 12/2002 | Braun et al. ................. 455/436 |
| 6,611,942 B1 | 8/2003 | Battistello et al. |
| 6,628,707 B2 | 9/2003 | Ratie et al. |
| 6,647,059 B1 | 11/2003 | Faruque |
| 6,665,810 B1 * | 12/2003 | Sakai ......................... 713/600 |
| 6,826,238 B2 | 11/2004 | Ahn |
| 6,829,298 B1 | 12/2004 | Abe et al. |
| 6,836,515 B1 | 12/2004 | Kay et al. |
| 6,888,794 B1 * | 5/2005 | Jovanovic et al. ........... 370/230 |
| 6,915,463 B2 | 7/2005 | Vieregge et al. |
| 6,920,189 B1 | 7/2005 | Spalink |
| 6,954,504 B2 | 10/2005 | Tiedemann, Jr. et al. |
| 7,003,042 B2 * | 2/2006 | Morelos-Zaragoza et al. ......................... 375/253 |
| 7,016,296 B2 | 3/2006 | Hartman, Jr. |
| 7,046,753 B2 | 5/2006 | Resheff et al. |
| 7,047,029 B1 | 5/2006 | Godwin et al. |
| 7,133,425 B2 * | 11/2006 | McClellan ................. 370/535 |
| 7,133,441 B1 | 11/2006 | Barlev et al. |
| 7,187,719 B2 * | 3/2007 | Zhang ........................ 375/261 |
| 7,200,188 B2 | 4/2007 | Fague et al. |
| 7,254,190 B2 | 8/2007 | Kwentus et al. |
| 7,333,556 B2 * | 2/2008 | Maltsev et al. .............. 375/295 |
| 7,366,091 B1 | 4/2008 | Lahti et al. |
| 7,460,583 B2 | 12/2008 | Khayrallah et al. |
| 2002/0016933 A1 | 2/2002 | Smith et al. |
| 2002/0051498 A1 | 5/2002 | Thomas et al. |
| 2002/0061752 A1 | 5/2002 | Kurokami |
| 2002/0181490 A1 | 12/2002 | Frannhagen et al. |
| 2003/0021370 A1 | 1/2003 | Menkhoff |
| 2003/0043778 A1 | 3/2003 | Luschi et al. |
| 2003/0066082 A1 | 4/2003 | Kliger et al. |
| 2003/0135532 A1 | 7/2003 | Peting |
| 2004/0017860 A1 * | 1/2004 | Liu ............................ 375/299 |
| 2004/0063416 A1 | 4/2004 | Kuenen et al. |
| 2004/0081081 A1 | 4/2004 | Colombo |
| 2004/0086668 A1 | 5/2004 | Dronzek et al. |
| 2004/0151108 A1 | 8/2004 | Blascoet et al. |
| 2004/0217179 A1 | 11/2004 | Garner |
| 2005/0002474 A1 | 1/2005 | Limberg |
| 2005/0010853 A1 | 1/2005 | Duvant et al. |
| 2005/0063496 A1 | 3/2005 | Guillouard et al. |
| 2005/0075078 A1 | 4/2005 | Makinen et al. |
| 2005/0169401 A1 * | 8/2005 | Abraham et al. ............ 375/295 |
| 2005/0190868 A1 | 9/2005 | Khandekar et al. |
| 2005/0239398 A1 | 10/2005 | Lai |
| 2005/0265436 A1 | 12/2005 | Suh et al. |
| 2006/0008018 A1 | 1/2006 | Kolze |
| 2006/0013181 A1 | 1/2006 | Stolpman et al. |
| 2006/0107179 A1 | 5/2006 | Shen et al. |
| 2006/0203943 A1 | 9/2006 | Scheim et al. |
| 2006/0209939 A1 | 9/2006 | Mantha |
| 2007/0076719 A1 | 4/2007 | Allan et al. |
| 2007/0116143 A1 | 5/2007 | Bierke et al. |
| 2007/0116162 A1 | 5/2007 | Eliaz et al. |
| 2007/0133397 A1 | 6/2007 | Bianchi et al. |
| 2007/0153726 A1 * | 7/2007 | Bar-Sade et al. ............ 370/329 |
| 2007/0230641 A1 | 10/2007 | Yehudai |
| 2008/0008257 A1 | 1/2008 | Yonesi et al. |
| 2008/0043829 A1 | 2/2008 | Shiue et al. |
| 2008/0130726 A1 | 6/2008 | Sofer et al. |
| 2008/0155373 A1 | 6/2008 | Friedman et al. |
| 2008/0254749 A1 | 10/2008 | Ashkenazi et al. |
| 2008/0259901 A1 | 10/2008 | Friedman et al. |
| 2009/0022239 A1 | 1/2009 | Kimura et al. |
| 2009/0049361 A1 | 2/2009 | Koren et al. |
| 2009/0092208 A1 | 4/2009 | Montekyo et al. |

FOREIGN PATENT DOCUMENTS

| | | |
|---|---|---|
| JP | 6021762 A | 1/1994 |
| JP | 9064791 A | 3/1997 |
| WO | 0060802 A1 | 10/2000 |
| WO | 0077952 A1 | 12/2000 |
| WO | WO 00/76114 | 12/2000 |
| WO | 2004086668 A1 | 10/2004 |
| WO | 2006097735 A2 | 9/2006 |
| WO | 2006118892 A1 | 11/2006 |
| WO | 2007040906 A2 | 4/2007 |

OTHER PUBLICATIONS

Benani et al., "Comparison of Carrier Recovery Techniques in M-QAM Digital Communications Systems", Proceedings of 13th Annual Canadian Conference on Electrical and Computer Engineering, pp. 73-77, Halifax, Canada, Mar. 7-10, 2000.

Best R., "Phase Locked Loops: Design, Simulation, and Applications", McGraw Hill Professional, 5th Edition, pp. 81-92, Jun. 20, 2003.

Calderbank A., "Multilevel Codes and Multistage Decoding", IEEE Transactions on Communications, vol. 37, No. 3 Mar. 1989.

Colavolpe et al., "Algorithms for iterative decoding in the presence of strong phase noise", IEEE Journal on Selected Areas in Communications, vol. 23, No. 9, pp. 1748-1757, Sep. 2005.

Goeckel D., "Adaptive Coding for Time-Varying Channels Using Outdated Fading Estimates", IEEE Transactions on Communications, vol. 47, No. 6, Jun. 1999.

Dr. Lin-Nan Lee, "LDPC Codes, Application to Next Generation Communication Systems", Hughes Network System Oct. 8, 2003.

Duel-Hallen et al., "Long Range Prediction of Fading Signals: Enabling Adaptive Transmission for Mobile Radio Channels" IEEE Signal Processing Magazine, vol. 17, No. 3, pp. 62-75, May 2000.

ITU Recommendation G.703, "General Aspects of Digital Transmission Systems-Terminal Equipments-Physical/Electrical Characteristics of Hierarchical Digital Interfaces", Geneva, Switzerland 1991.

ITU Recommendation G.704, "Series G: Transmission Systems and Media, Digital Systems and Networks, Digital Transmission Systems-Terminal Equipments-General, Synchronous Frame Structures used at 1544, 6312, 2048, 8448 and 44736 kbit/s hierarchical levels", Oct. 1998.

Gagnon et al., "A Simple and Fast Carrier Recovery Algorithm for High-Order QAM", IEEE Communications Letters, vol. 9, No. 10, pp. 918-920, Oct. 2005.

Gallager R., "Low-Density Parity—Check Codes", IRE Transactions on Information Theory, vol. 7, pp. 21-28, Jan. 62.

GR-253-CORE by Telcordia Technologies, "Synchronous optical network (SONET) transport systems: common criteria" Issue 3, Sep. 2000.

Hassan K., "LPDC encoded pilots for iterative receiver improvement", Thesis submiteed to the College Engineering of Wichita State University, Dec. 2005.

Ericsson AB, "Capacity without ties; Mini-Link microwave transmission solution", EN/LZT 712 0117 R2, Molndal, Sweden, 2005.

Hu et al., "Adaptive Modulation Using Long Range Prediction for Flat Rayleigh Fading Channels", Proceedings of the IEEE International Symposium on Information Theory, Sorrento, Italy, Jun. 25-30, 2000.

Niu et al., "Iterative Channel Estimation and LDPC Decoding over Flat Fading Channels: A Factor Graph Approach" 2003 Conference on Information Sciences and Systems, the Johns Hopkins University, Mar. 12-14, 2003.

Imai et al., "A New Multilevel Coding Method Using Error-Correcting Codes", IEEE Transactions on Information Theory, vol. IT-23, No. 3, 1977.

ITU Recommendation G.707/Y.1322, "Series G: Transmission systems and media, digital systems and networks, digital terminal equipments -general: Series Y: global information infrastructure and internet protocol aspects—transport; Network node interface for the syncronours digital hierarchy (SDH)", Oct. 2000.

ITU Recommendation G.783, "General Aspects of Digital Transmission Systems: Terminal Equipments—Characteristics of Syncronous Digital Hierarchy (SDH) Equipment Functional Blocks", Jan. 1994.

Sun J., "An Introduction to low Density Parity Check (LDPC) Codes", West Virginia University, Jun. 3, 2003.

Johnson et al., "Blind Equalization Using the Constant Modulus Criterion: A Review", Proceedings of the IEEE, vol. 86, No. 10, Oct. 1998.

Kim et al., "Design of Carrier Recovery Algorithm for High-Order QAM with Large Frequency Acquisition Range", IEEE International Conference on Communications (ICC), pp. 1016-1020, vol. 4, Helsinki, Finland, Jun. 11-14, 2001.

Kschischang F., "Capacity Approching Codes, Iterative Decoding Algorithms and Their Application: Codes defined on Graphs", IEEE Communications Magazine, pp. 118-125, Aug. 2003.

Mielczarek et al., "Improving phase estimation with enhanced turbo decoders", Nordic Radio Symposium 2001 (NRS01), Nynashamn, Sweden, Apr. 3-5, 2001.

Mielczarek et al., "Phase offset estimation using enhanced turbo decoders", Proceedings of the IEEE International Conference on Communications (ICC2002), vol. 3, pp. 1536-16460, New York, USA, Apr. 28-May 2, 2002.

Pottie et al., "Multilevel Codes based on Partitioning", IEEE Transactions on Information Theory, vol. 35, No. 1, pp. 87-98, Jan. 1989.

Richardson et al., "An Introduction to the Analysis of Iterative Coding Systems", Proceedings of the 1999 Institute for Mathematics and its Applications (IMA) Summer Program: codes, systems and graphical models, Minneapolis, USA Aug. 2-6, 1999.

Richardson etr al., "Capacity Approaching codes; Iterative Decoding Algorithms and Their Application: The Renaissance of Gallager's Low-Densityy parity Check Codes", IEEE Communications Magazine, pp. 126-131, Aug. 2003.

Riegel M., "Requirements for edge-to edge estimation of time deivision multiplexed (TDM) circuits over packet switching networks", IETF Network Working Group, RFC 4197, Oct. 2005.

Ryan et al., "An introduction to LDPC Codes", GlobeCom 2003, San Francisco, USA, Dec. 5, 2003.

Saroka et al., "Joint Carrier Phase Estimation and Turbo Decoding Using Bit-Carrier-Phase APP Decoder", IEEE Transactions on Communications, 2004.

Satorius et al., "Adaptive modulation and coding techniques in MUOS fading/scintillation environments", Proceedings of the IEEE Military Communications Conference, Anaheim, USA, vol. 1, pp. 321-327, Oct. 7-10, 2002.

Standard T1.102-1993 of the ANSI, "American National Standard for Telecommunications-Digital Hierarchy-Electrical Interfaces", Dec. 1993.

Worthen et al., "Unified Design of Iterative Receivers Using Factor Graphs", IEEE Transactions on Information Theory, vol. 47, No. 2, pp. 843-849, Feb. 2001.

Jin et al., "Analysis of Joint Channel Estimation and LDPC Decoding on Block Fading Channels", International Symposium on Information Theory and its Applications, ISITA2004, Parma, Italy, Oct. 10-13, 2004.

U.S. Appl. No. 11/285,414 Official Acrtion dated Mar. 6, 2009.
U.S. Appl. No. 11/285,414 Official Action dated May 23, 2008.
U.S. Appl. No. 11/285,414 Official Action dated Nov. 12, 2008.
U.S. Appl. No. 11/394,172 Official Action dated Jan. 21, 2009.
U.S. Appl. No. 11/394,172 Official Action dated Jun. 16, 2008.
U.S. Appl. No. 11/394,172 Official Action dated Jun. 26, 2009.
U.S. Appl. No. 11/483,078 Official Action dated Mar. 27, 2009.
U.S. Appl. No. 11/483,078 Official Action dated Jun. 2, 2008.
U.S. Appl. No. 11/483,078 Official Action dated Nov. 12, 2008.
International Application PCT/IL2006/001344 Search Report dated Mar. 13, 2008.
International Application PCT/IL2007/000326 Search Report dated Aug. 1, 2008.
International Application PCT/IL2007/000812 Search Report dated Jun. 4, 2008.
International Application PCT/IL2007/001410 Search Report dated Jan. 26, 2009.
International Application PCT/IL2008/001321 Search Report dated Feb. 19, 2009.
International Application PCT/IL2008/000453 Search Report dated Jun. 17, 2009.
Chinese Application No. 200580028811.1 Official Action dated Dec. 5, 2008.
European Application No. 08290290.9 Official Action dated Jun. 18, 2009.
European Application No. 08290290.9 Search Report dated Oct. 15, 2008.
Japanese Application No. 2007518808 Official Action dated Jan. 29, 2009.
Japanese Application No. 2007518808 Official Action dated Jun. 4, 2008.
U.S. Appl. No. 11/634,781 Official Action dated Sep. 21, 2009.
U.S. Appl. No. 11/645,828 Official Action dated Sep. 15, 2009.

* cited by examiner

CASCADED LINKS WITH ADAPTIVE CODING AND MODULATION

FIELD OF THE INVENTION

The present invention relates generally to wireless communication systems, and particularly to methods and systems for using variable data rates in wireless data links.

BACKGROUND OF THE INVENTION

In some wireless communication systems, transmission and reception functions are divided between an indoor unit (IDU) and an outdoor unit (ODU), typically located adjacent to the antenna. The IDU and ODU are connected by a link, which may be analog or digital. For example, U.S. Pat. No. 5,987,060, whose disclosure is incorporated herein by reference, describes a system and method for communication having a digital signal link connecting the IDU and ODU.

In some cases, the data rate of the communication system is variable. For example, U.S. Pat. No. 7,016,296, whose disclosure is incorporated herein by reference, describes methods and systems that enable subscribers to share a wireless channel by using different modulation schemes. The modulation scheme assigned to a subscriber is determined based on measurements of the quality of signals received from that subscriber. In one embodiment, the system is capable of transmitting data using one of a number of encoding and symbol constellation configurations.

As another example, U.S. Pat. No. 6,836,515, whose disclosure is incorporated herein by reference, describes a radio consisting of a multi-modulation modem, which modulates and demodulates signals using a plurality of modulations. The radio also comprises a frequency converter for converting the signals to a radio frequency and a transceiver unit including an antenna coupled to the frequency converter for transmitting the signals over a radio communications link.

As yet another example, PCT Publication WO 0076114 A1, which is incorporated herein by reference, describes a system for providing adjustable levels of information density in a communicated data stream in response to monitored communication link conditions.

SUMMARY OF THE INVENTION

Some wireless communication systems are partitioned into first and second communication units, which are connected by a cable connection. The first unit communicates with a remote communication system over a wireless link having a variable data rate. The second unit exchanges data with the remote communication system by communicating with the first unit over the cable connection.

For example, some wireless communication systems comprise an indoor unit (IDU) and an outdoor unit (ODU), which is located adjacent to the antenna. The IDU and ODU communicate with one another over a cable connection, such as a coaxial cable, twisted pair or optical fiber. A variable-rate modem in the ODU, such as a modem that uses adaptive coding and modulation (ACM), transmits and receives data over a wireless channel to another communication system. Locating the modem adjacent to the antenna significantly simplifies the radio frequency (RF) design of the communication system.

However, when the data rate over the wireless link varies, the data rate over the cable connection between the first and second communication units should be modified accordingly. Embodiments of the present invention provide methods and systems for performing such data rate coordination between the wireless link and the cable connection.

In some embodiments, the cable connection is operated at a constant data rate, which is sufficiently high to support the highest possible data rate of the wireless link. When the wireless link uses a lower data rate, dummy data is transmitted over the cable connection so as to compensate for the data rate difference.

Additionally or alternatively, the data rate of the cable connection is modified to match the data rate of the wireless link by modifying at least one of a modulation scheme and a coding rate used for communicating over the cable connection.

Further additionally or alternatively, the data rate of the cable connection is modified by modifying the baud rate of the cable connection, either by modifying the physical clock rate of the cable connection, or by applying a suitable signal processing method that emulates a baud rate modification.

There is therefore provided, in accordance with an embodiment of the present invention, a communication system, including:

a first communication unit, which is arranged to communicate with a remote communication system over a first communication link having a first, variable data rate; and a second communication unit, which is arranged to exchange data with the remote communication system by communicating with the first communication unit over a second communication link having a second data rate, wherein the first and second communication units are arranged to modify the second data rate responsively to variations in the first data rate, so as to match the second data rate to the first data rate.

In a disclosed embodiment, the first communication link includes a wireless link, and the second communication link includes a wireline link. Typically, the second link includes at least one of a coaxial cable, a twisted pair and an optical link. Alternatively, the first and second links include wireless links for relaying data between the second communication unit and the remote communication system.

In one embodiment, the first communication unit includes an outdoor unit (ODU) located adjacent to an antenna of the first communication link, and the second communication unit includes an indoor unit (IDU) of the system.

In some embodiments, the first and second communication units are arranged to modify the second data rate without modifying a physical data rate of the second communication link. Typically, the first and second communication units are arranged to insert dummy data into the data transmitted over the second communication link so as to modify an effective data rate of the second communication link without modifying the physical data rate of the second communication link. The first and second communication units may be arranged to determine an amount of the dummy data to be inserted based on a difference between the first data rate and the physical data rate of the second communication link, and to insert fields identifying locations of the dummy data into the data transmitted over the second communication link.

Additionally or alternatively, the first and second communication units are arranged to encode the data transmitted over the second communication link using an error correcting code (ECC), and to modify the second data rate by selecting a code rate of the ECC based on a difference between the first data rate and the physical data rate of the second communication link.

In another embodiment, the first and second communication units are arranged to modulate the data transmitted over the second communication link using a modulation scheme, and to modify the second data rate by selecting a symbol constellation of the modulation scheme so as to match the first data rate.

Additionally or alternatively, the first communication unit includes a variable-rate modem, which is arranged to vary the first data rate by modifying at least one of a modulation scheme and a code rate used to communicate over the first communication link.

In a disclosed embodiment, at least one of the first and second communication units are arranged to determine a value of the first data rate based on a quality of reception over the first communication link. Additionally or alternatively, at least one of the first and second communication units is arranged to determine the value of the first data rate based on a prediction of future channel conditions of the first communication link. Typically, the prediction is based on at least one of a mean square error (MSE), a received signal level (RSL), a bit error rate (BER) and equalizer coefficient values at a receiver of the remote communication system.

In some embodiments, the second communication unit is arranged to format the data in a first sequence of data frames, to encapsulate the first sequence of data frames in a second sequence of cable frames and to transmit the second sequence of cable over the second communication link, and wherein the first communication unit is arranged to de-capsulate the second sequence of cable frames received over the second communication link so as to extract the first sequence of data frames, and to transmit the first sequence of data frames over the first communication link. Typically, the second communication unit is arranged to insert into the cable frames fields indicating locations of the data frames in the cable frames, and the first communication unit is arranged to determine the locations of the data frames based on the fields.

Additionally or alternatively, the first and second communication units include respective first and second controllers, which are arranged to exchange management data with one another by inserting the management data into the cable frames. The first communication link may use adaptive coding and modulation (ACM) in order to vary the first data rate, wherein the management data includes indications of ACM settings to be used by the first communication link.

In some embodiments, the first and second communication units are arranged to modify the second data rate by modifying a physical data rate of the second communication link. Typically, the first and second communication units are arranged to determine a modification to the physical data rate of the second communication link based on a difference between the first data rate and the physical data rate of the second communication link. Additionally or alternatively, the first and second communication units are arranged to modify the physical data rate of the second communication link by selecting a baud rate responsively to the first data rate.

There is also provided, in accordance with an embodiment of the present invention, a method for communication, including:

communicating between first and second communication systems over a cascaded connection of a first communication link having a first, variable data rate, and a second communication link having a second data rate; and modifying the second data rate responsively to variations in the first data rate, so as to match the second data rate to the first data rate.

There is additionally provided, in accordance with an embodiment of the present invention, a communication network, including:

a first communication system, including:
a first communication unit, which is arranged to communicate over a first communication link having a first, variable data rate; and
a second communication unit, which is arranged to communicate with the first communication unit over a second communication link having a second data rate; and
a second communication system, including:
a third communication unit, which is arranged to communicate with the first communication unit over the first communication link; and
a fourth communication unit, which is arranged to send data to the second communication unit via the first and second communication links by communicating with the third communication unit over a third communication link having a third data rate,
wherein the first, second, third and fourth communication units are arranged to modify at least one of the second and third data rates responsively to variations in the first data rate, so as to match the at least one of the second and third data rates to the first data rate.

Typically, the first communication unit includes a variable rate modem, which is arranged to assess a quality of reception over the first communication link, and the variations in the first data rate are determined responsively to the assessed reception quality. In a disclosed embodiment, the first communication unit is arranged to indicate the variations in the first data rate to the fourth communication unit, and the fourth communication unit is arranged to initiate a modification of the first data rate and the at least one of the second and third data rates based on the indicated variations. The first communication unit may be arranged to indicate the variations to the fourth communication unit via the second communication unit. Additionally or alternatively, the first communication unit is arranged to indicate the variations to the fourth communication unit via the third communication unit.

The present invention will be more fully understood from the following detailed description of the embodiments thereof, taken together with the drawings in which:

DETAILED DESCRIPTION OF EMBODIMENTS

System Description

Figure 1:
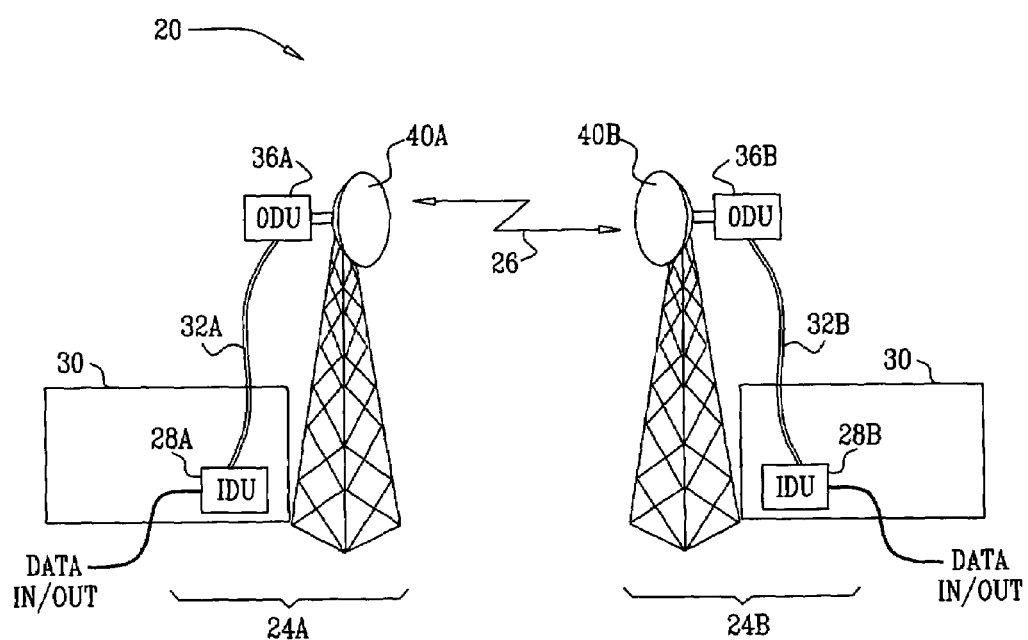
FIG. 1 is a schematic diagram showing a wireless communication network, in accordance with an embodiment of the present invention.

FIG. 1 is a schematic diagram showing a wireless communication network 20, in accordance with an embodiment of the present invention. Network 20 comprises communication systems 24, which communicate with one another via a wireless channel 26. In the exemplary embodiment of FIG. 1, network 20 comprises two microwave communication systems denoted 24A and 24B, arranged in a point-to-point configuration. In alternative embodiments, network 20 may comprise any number of communication systems arranged in any suitable configuration. Systems 24 may typically comprise any suitable kind of communication terminal.

Each system 24 comprises an indoor unit (IDU) 28, which is located in a building 30 or other indoor installation. The IDU is connected by a cable connection 32 to an outdoor unit (ODU) 36. The outdoor unit is coupled to an antenna 40. The ODU is typically located adjacent to the antenna in order to reduce the signal losses between the ODU and the antenna. Cable connection 32 may comprise any suitable data connection, such as a connection over a coaxial cable, a twisted pair or an optical fiber. The IDU and/or ODU may comprise suitable interface circuitry (not shown), such as line drivers, modems, or optical transceivers, for interfacing with the medium in question.

Consider, for example, transmission of data from a communication system acting as a transmitter to another communication system acting as a receiver. (Typically, each system 24 comprises a bidirectional system that performs both transmission and reception. In other words, each system typically serves both as a transmitter and as a receiver simultaneously.)

The IDU of the transmitter accepts the data for transmission. The IDU sends the data over the cable connection to the ODU. The transmitter ODU encodes the data using an error correcting code (ECC) and modulates the data using a predetermined modulation scheme to produce a modulated radio signal. Typically, the transmitter ODU modulates the data by mapping data bits to transmitted symbols selected from a predetermined signal constellation. The ODU transmits the radio signal via the transmitter antenna over wireless channel 26. The radio signal is received by the receiver antenna and provided to the receiver ODU. The receiver ODU demodulates and decodes the signal to extract the transmitted data, and sends the extracted data over the cable connection of the receiver to the receiver IDU. The IDU outputs the data.

The rate of information transmitted over the wireless link, i.e., the data rate of the transmitted radio signal, is variable. As will be shown below, the ODUs of the transmitter and receiver comprise variable rate modems, which vary the data rate of the radio signal. For example, in some embodiments the receiver estimates the conditions of channel 26, and the data rate of the wireless link is configured so as to suit the estimated channel conditions. Estimating the channel conditions can be based on measurements of signal-to-noise ratio (SNR), bit error rate (BER), and/or received signal level (RSL), or using any other suitable method known in the art.

In some embodiments, a decision to change the data rate of the wireless link may be taken based on a prediction indicating that the channel conditions are expected to deteriorate, even though the current conditions are still acceptable. For example, the receiver may track the reception quality (e.g., SNR, BER or RSL) over time and extrapolate it to predict the future channel conditions. Additionally or alternatively, the receiver modem typically comprises an adaptive equalizer (not shown), which is used, inter alia, for compensating for the channel response. Tracking the values of the equalizer coefficients often provides a good prediction of future channel conditions.

In some embodiments, the transmitter and receiver may use adaptive coding and modulation (ACM). In ACM, the code rate of the ECC and the signal constellation are jointly selected to produce the desired data rate and/or quality of service, given the estimated channel conditions. Typically, two or more combinations of code rate and signal constellation are predefined. Each combination of code rate and signal constellation is referred to as an ACM setting. A suitable ACM setting, often based on reception quality measurements performed at the receiver, is selected. The selection may be performed either by the receiver or by the transmitter, as will be explained below.

For example, the transmitter and receiver may use low density parity check (LDPC) ECC and Quadrature amplitude modulation (QAM). Each ACM setting comprises a particular LDPC code rate and a particular QAM constellation. Alternatively, any other suitable modulation and coding scheme can be used for defining the ACM settings. Often but not necessarily, the symbol rate (and consequently the occupied bandwidth) over the wireless link remains constant, and the ACM settings differ from one another by the code rate and/or the number of constellation symbols.

The data transmitted from the transmitter to the receiver can be viewed as passing through three data links in cascade: a cable link (IDU to ODU) in the transmitter, a wireless link from the transmitter to the receiver (ODU to ODU) and another cable link (ODU to IDU) in the receiver. Since the data rate over the wireless link is variable, the data rate of the two cable data links in the cascade should be configured accordingly. The methods and systems described herein provide such data rate coordination.

Figure 2:
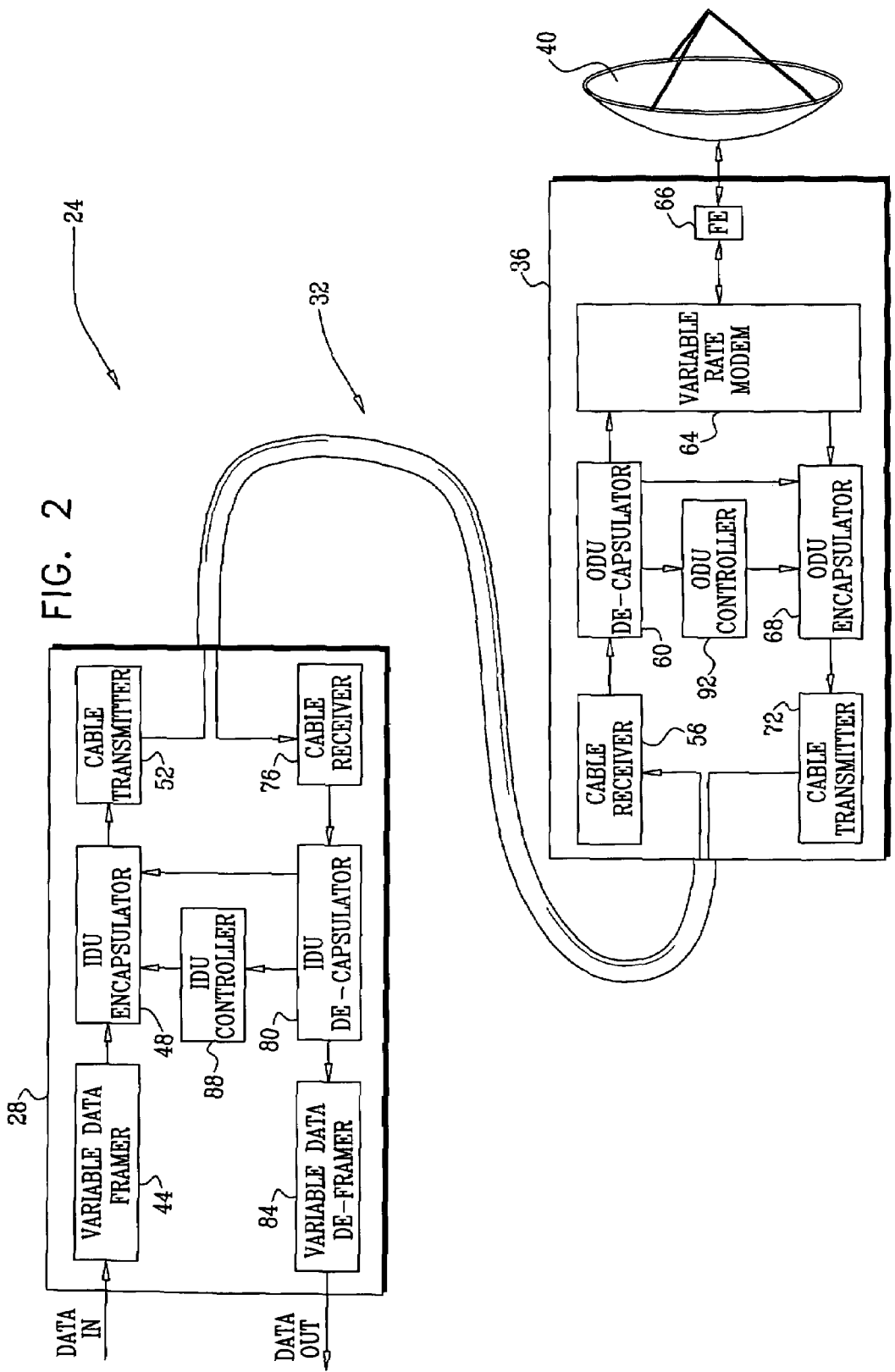
FIG. 2 is a block diagram that schematically illustrates details of a communication system, in accordance with an embodiment of the present invention.

FIG. 2 is a block diagram that schematically illustrates details of communication system 24, in accordance with an embodiment of the present invention. System 24 is partitioned into IDU 28 and ODU 36, which are connected by cable connection 32.

When system 24 functions as a transmitter, data for transmission enters IDU 28 and is formatted in data frames by a variable rate data framer 44. The data frames are later used in the ODU, for structuring the data for transmission over the wireless channel. In particular, as will be shown below, each data frame is encoded and modulated in accordance with a particular ACM setting. In order to transmit the data over cable connection 32 to the ODU, an IDU encapsulation module 48 encapsulates the data frames in outer frames, referred to as cable frames.

The cable frames and data frames may differ in size and are generally not synchronized with each other. As part of the encapsulation process, module 48 typically inserts into the cable frames synchronization markers that indicate the location of the data frames. For example, a synchronization marker may comprise a field in the cable frame, whose value indicates a location of the beginning of the data frame within the cable frame. Alternatively, synchronization markers may comprise any suitable predetermined data sequences, such as correlation sequences or other known data patterns inserted into the cable frames to indicate the location of the data frame within the cable frame.

A cable transmitter 52 encodes and modulates the data in the cable frames for transmission over the cable connection. The cable transmitter encodes the data of the cable frames with a cable ECC. The cable ECC is used only for communicating over cable connection 32, and should not be confused with the ECC used over the wireless link. In some embodiments, cable transmitter 52 uses a Reed-Solomon code. Alternatively, any other suitable ECC can be used as a cable ECC. The encoded cable frames are transmitted to the ODU over cable connection 32.

At the ODU, the data is decoded and demodulated by a cable receiver 56. In particular, cable receiver 56 decodes the cable ECC. An ODU de-capsulation module 60 extracts the data frames from the outer cable frames. The output of module 60 comprises the data frames, as produced by framer 44, together with the synchronization markers that mark the location of the data frames. The data frames are provided to a variable rate modem 64. The modem modulates and encodes the data frames using the currently-used ACM setting, to produce a modulated radio signal. The radio signal is up-converted, filtered and amplified by a radio frequency (RF) front end (FE) 66. The signal is then fed to antenna 40 and transmitted over wireless channel 26 to another system 24 serving as a receiver.

FIG. 2 shows only a single system 24 for simplicity. The reception functions described below are actually performed by a similar system 24 located at the opposite end of the wireless link. When system 24 serves as a receiver, the RF signal is received by antenna 40 and provided to ODU 36. The RF signal is down-converted and filtered by FE 66. Modem 64 of the receiver demodulates and decodes the received signal using the currently-used ACM setting.

An ODU encapsulation module 68 encapsulates the data received over the wireless link in cable frames. A cable transmitter 72, similar in structure to transmitter 52, modulates and encodes the data. The cable frames are then transmitted over connection 32 to the IDU.

A cable receiver 76, similar in structure to receiver 56, decodes and demodulates the data transmitted over the cable. An IDU de-capsulation module 80 extracts the data received over the wireless link from the cable frames using synchronization markers indicating the location of the data frames in the cable frames. A variable rate data de-framer 84 extracts the information or data from the data frames produced by framer 44 of the remote system, and the information is provided as output.

IDU 28 comprises an IDU controller 88, which performs the various management functions of the IDU. ODU 36 comprises an ODU controller 92, which performs the various management functions of the ODU. The ODU and IDU controllers can exchange management data and messages with one another over cable connection 32.

In some embodiments, the controllers insert management data into the cable frames, as part of the encapsulation of the data frames. IDU controller 88 provides management data to IDU encapsulation module 48. Module 48 inserts the management data into the cable frames. At the ODU, de-capsulation module 60 extracts the management data from the cable frames as part of the de-capsulation process, and provides the management data to ODU controller 92. Similarly, management data can be transmitted from controller 92 to controller 88 over cable connection 32 using modules 68 and 80. In general, the four controllers of link 20 (i.e., the IDU and ODU controllers of the two communication systems) can communicate with one another either directly or indirectly using the framers and encapsulators.

In some embodiments, direct communication is possible only between the IDU controller and ODU controller of a particular system, or between the IDU controllers of the transmitter and the receiver. In these embodiments, other communication paths are relayed. For example, the ODU controller of the receiver and the IDU controller of the transmitter may communicate via the IDU controller of the receiver.

Note that the communication system configuration of FIG. 2 is an exemplary configuration, chosen purely for the sake of conceptual clarity. Any other suitable configuration can be used. For example, data framer 44 and encapsulator 48 can be combined into a single module. Modules 80 and 84 may similarly be combined in a single unit.

Data Rate Coordination Methods

Since modems 64 of the transmitter and receiver communicate using ACM, the data rate over the wireless link is variable. Switching from one ACM setting to another is performed in a coordinated and synchronized manner across network 20, so that all three cascaded data links modify their data rates without losing data.

As noted above, changing the ACM setting is usually determined based on reception quality measurements performed by the receiver. Therefore, the information on which the decision is based is produced by modem 64 of the receiver, located in the receiver ODU. The decision as to which ACM setting to use in the next data frame, based on the measurements of the receiver modem, may be carried out either in the receiver or in the transmitter, as desired.

On the other hand, the process of switching to a different ACM setting is typically initiated by data framer 44 of the transmitter on the remote side of the link. Thus, regardless of the system element that determines the next ACM setting, this decision should be communicated to the data framer in the transmitter IDU, which initiates the switching process. The information is typically communicated using management data exchanged among the IDU and ODU controllers of the transmitter and receiver. Generally, a change in ACM setting involves and affects the data framer and de-framer, the IDU and ODU encapsulators and de-capsulators, the cable transmitters and receivers, as well as both modems.

In some embodiments, each data frame comprises a field indicating the ACM setting selected for the next data frame. In alternative embodiments, each data frame may comprise an indication of the ACM setting to be used in the current frame, or in any other frame offset agreed between the transmitter and receiver.

When the wireless link is about to switch to a different ACM setting, the data rates of cable connections 32 in the transmitter and receiver should be changed accordingly.

In some embodiments, the cable connection is operated at a constant physical data rate, which is sufficiently high to support the highest possible data rate of the wireless link, plus overheads such as the cable ECC and synchronization markers. When the wireless link operates at a lower data rate, the encapsulation module (48 and/or 68, depending on the direction of transmission) inserts dummy data into the cable frames between successive data frames to compensate for the difference in data rate. In other words, inserting the dummy data modifies the effective data rate of the cable connection without modifying its physical data rate. The amount of dummy data inserted by the encapsulation module depends on the difference between the data rates of the cable connection and the wireless link. This process is referred to as byte stuffing.

The encapsulation module marks the location of the data frames within the cable frames using synchronization markers, or using any other suitable mechanism. The de-capsulation module (60 and/or 80) uses the synchronization markers to extract the meaningful information from the cable frames and ignore or discard the dummy data.

As another example, the data rate of the cable link can be adapted by modifying the code rate used by the cable transmitters (52 and/or 72) and receivers (56 and/or 76). When the data rate over the wireless link is low, the code rate of the cable ECC may be decreased, thus producing and sending a higher number of redundancy bits over the cable connection. When the data rate over the wireless link increases, the code rate of the cable ECC is increased.

Additionally or alternatively, the difference in data rates between the wireless link and the cable connection can be compensated for by adapting the physical data rate of the cable to the data rate of the wireless link. For example, the physical data rate of the cable link can be adapted by modifying the symbol constellation used by the cable transmitters (52 and/or 72) and receivers (56 and/or 76). A smaller or larger constellation may be used in the cable link when the data rate over the wireless link decreases or increases, respectively.

Further additionally or alternatively, the physical data rate of the cable connection can be modified by modifying the baud rate, so that the data rate of the cable connection matches the data rate of the wireless link. Modifying the baud rate can be carried out by varying the physical clock rate of the cable connection. Alternatively, the physical clock rate can be kept constant, and a re-sampling or other signal processing method applied to the data transmitted over the cable connection. Any suitable combination of byte stuffing, constellation modification, cable ECC code rate modification and/or baud rate modification can be used to coordinate the data rate of the cable connections and the wireless link.

In some embodiments, communication over the cable connection is implemented using a pair of wireline modems similar to modems 64, for example over a coaxial cable. The wireline modems use ACM, which enables the data rate over the cable connection to vary. In these embodiments, the data rate of the cable connection is modified by changing the ACM setting of the wireline modems, so as to match the data rate of the wireless link. In general, the signal constellations and/or type of ECC used in the wireline modems may differ from those used in modems 64 of the wireless link, since the characteristics of the coaxial cable are generally different from the characteristics of wireless channel 26.

Figure 3:
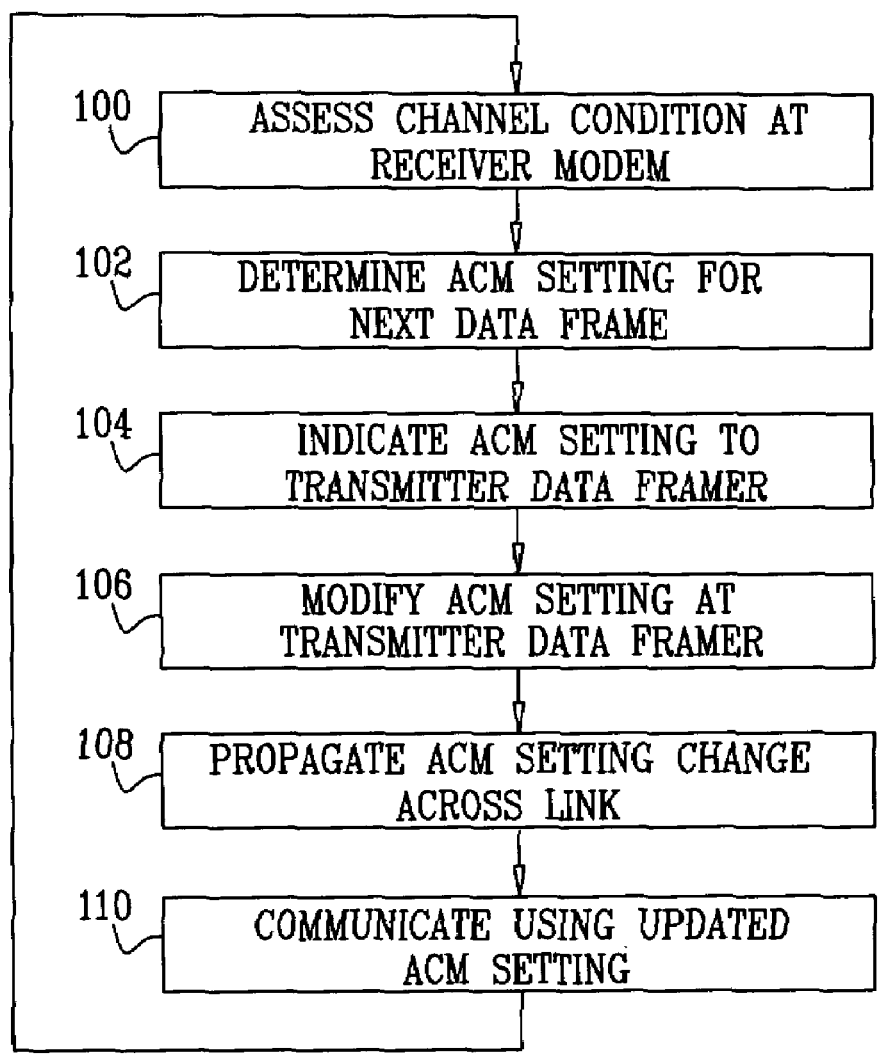
FIG. 3 is a flow chart that schematically illustrates a method for coordinating wireless link and cable connection data rates, in accordance with an embodiment of the present invention.

FIG. 3 is a flow chart that schematically illustrates a method for coordinating wireless link and cable connection data rates, in accordance with an embodiment of the present invention. The method begins with modem 64 of the receiver assessing the channel conditions, at a channel assessment step 100. The receiver modem performs reception quality measurements, such as, for example, mean square error (MSE), signal to noise ratio (SNR), received signal level (RSL) or bit error rate (BER) measurements.

Depending on the assessed channel conditions, the ACM setting to be used in the next data frame is selected, at an ACM setting selection step 102. In general, the selection can be performed by either the ODU or IDU controller of either the transmitter or the receiver.

The next ACM setting is indicated to data framer 44 of the transmitter, at a setting communication step 104. In some embodiments, for example when the selection of ACM setting is performed at the transmitter, the assessed channel condition is sent from the receiver ODU to the transmitter. The transmitter uses the assessed channel condition to select the ACM setting and indicate the setting to its data framer. Alternatively, for example when the ACM setting selection is performed at the receiver, the ACM setting itself is sent from the receiver to the transmitter IDU.

The information is sent using management information. For example, when the decision to change ACM setting is performed at the ODU of the receiver, the ODU controller of the receiver sends the indication of the new ACM setting to the IDU of the receiver using management information inserted into the cable frames. The IDU of the receiver sends the indication to the IDU of the transmitter using the data framer.

Assuming a change of ACM setting is desired, data framer 44 of the transmitter switches to the selected ACM setting, at a setting switching step 106. The new ACM setting is propagated, using management information, across the elements of link 20, at a setting propagation step 108. The actual change in ACM setting is performed in a synchronized manner across the link. In other words, the change is carried out in all link elements at a particular data frame, but not necessarily at the same time. At the appropriate data frame, the different elements of link 20 modify their operation to match the new ACM setting. For example, the transmitter data framer begins to accept and format data at a rate that matches the new ACM setting. The transmitter encapsulator and de-capsulator configure the data rate of the cable connection to match the new ACM setting. The modems of the transmitter and receiver change the ACM setting accordingly. Similarly, the receiver encapsulator and de-capsulator adapt to the new ACM setting. Finally, the receiver de-framer extracts the data in accordance with the new ACM setting.

In particular, the data rates of the cable connections in the transmitter and the receiver are reconfigured to match the new ACM setting (i.e., to match the data rate of the wireless link). The data rate of the cable connection can be modified using any of the methods described above Link 20 now begins to communicate using the newly selected ACM setting, at a communication step 110. The method then loops back to channel assessment step 100 above, to continue monitoring the channel conditions.

Although the embodiments described herein mainly address point-to-point systems comprising indoor and outdoor units, the methods and systems described herein can be used with any other configuration in which a variable rate data link is cascaded with one or more additional data links whose data rates should be coordinated. In particular, the methods and systems described herein can be used with any communication system, which is partitioned into two communication units connected by a data link. The communication units may be indoor or outdoor, and may be located at any desirable distance from one another. For example, the methods and systems described herein can be used to coordinate the data rates of relayed links, i.e., two or more communication links connected in cascade, of which at least one link has a variable data rate.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A communication system, comprising:
a first communication unit, which is arranged to communicate with a remote communication system over a first communication link having a first, variable data rate; and
a second communication unit, which is arranged to exchange data with the remote communication system by communicating with the first communication unit over a second communication link having a second data rate,
wherein the first and second communication units are arranged to modify the second data rate responsively to variations in the first data rate, so as to match the second data rate to the first data rate, wherein the first communication link uses Adaptive Coding and Modulation (ACM) in order to vary the first data rate, and wherein the first and second communication units are arranged to exchange with one another indications of ACM settings to be used by the first communication link,
wherein the second communication unit is arranged to format the data in a first sequence of data frames, to encapsulate the first sequence of data frames in a second sequence of cable frames and to transmit the second sequence of cable frames over the second communication link, wherein the first communication unit is arranged to de-capsulate the second sequence of cable frames received over the second communication link so as to extract the first sequence of data frames, and to transmit the first sequence of data frames over the first communication link, wherein the first and second communication units comprise respective first and second controllers, which are arranged to exchange management data with one another by inserting the management data into the cable frames, and wherein the management data comprises the indications of the ACM settings to be used by the first communication link.

2. The system according to claim 1, wherein the first communication link comprises a wireless link and wherein the second communication link comprises a wireline link.

3. The system according to claim 1, wherein the second link comprises at least one of a coaxial cable, a twisted pair and an optical link.

4. The system according to claim 1, wherein the first and second links comprise wireless links for relaying data between the second communication unit and the remote communication system.

5. The system according to claim 1, wherein the first communication unit comprises an outdoor unit (ODU) located adjacent to an antenna of the first communication link, and wherein the second communication unit comprises an indoor unit (IDU) of the system.

6. The system according to claim 1, wherein the first and second communication units are arranged to modify the second data rate without modifying a physical data rate of the second communication link.

7. The system according to claim 6, wherein the first and second communication units are arranged to insert dummy data into the data transmitted over the second communication link so as to modify an effective data rate of the second communication link without modifying the physical data rate of the second communication link.

8. The system according to claim 7, wherein the first and second communication units are arranged to determine an amount of the dummy data to be inserted based on a difference between the first data rate and the physical data rate of the second communication link, and to insert fields identifying locations of the dummy data into the data transmitted over the second communication link.

9. The system according to claim 6, wherein the first and second communication units are arranged to encode the data transmitted over the second communication link using an error correcting code (FCC), and to modify the second data rate by selecting a code rate of the FCC based on a difference between the first data rate and the physical data rate of the second communication link.

10. The system according to claim 1, wherein the first and second communication units are arranged to modulate the data transmitted over the second communication link using a modulation scheme, and to modify the second data rate by selecting a symbol constellation of the modulation scheme so as to match the first data rate.

11. The system according to claim 1, wherein the first communication unit comprises a variable-rate modem, which is arranged to vary the first data rate by modifying at least one of a modulation scheme and a code rate used to communicate over the first communication link.

12. The system according to claim 1, wherein at least one of the first and second communication units are arranged to determine a value of the first data rate based on a quality of reception over the first communication link.

13. The system according to claim 1, wherein at least one of the first and second communication units is arranged to determine the value of the first data rate based on a prediction of future channel conditions of the first communication link.

14. The system according to claim 13, wherein the prediction is based on at least one of a mean square error (MSE), a received signal level (RSL), a bit error rate (BER) and equalizer coefficient values at a receiver of the remote communication system.

15. The system according to claim 1, wherein the second communication unit is arranged to insert into the cable frames fields indicating locations of the data frames in the cable frames, and wherein the first communication unit is arranged to determine the locations of the data frames based on the fields.

16. The system according to claim 1, wherein the first and second communication units are arranged to modify the second data rate by modifying a physical data rate of the second communication link.

17. The system according to claim 16, wherein the first and second communication units are arranged to determine a modification to the physical data rate of the second communication link based on a difference between the first data rate and the physical data rate of the second communication link.

18. The system according to claim 16, wherein the first and second communication units are arranged to modify the physical data rate of the second communication link by selecting a symbol constellation responsively to the first data rate.

19. A method for communication, comprising:

communicating between first and second communication systems over a cascaded connection of a first communication link having a first, variable data rate, and a second communication link having a second data rate; and modifying the second data rate responsively to variations in the first data rate, so as to match the second data rate to the first data rate, wherein the first communication link uses Adaptive Coding and Modulation (ACM) in order to vary the first data rate, and wherein communicating over the cascaded connection comprises exchanging over the second communication link indications of ACM settings to be used by the first communication link, wherein communicating over the cascaded connection comprises formatting data in a first sequence of data frames, encapsulating the first sequence of data frames in a second sequence of cable frames, transmitting the second sequence of cable frames over the second communication link, de-capsulating the second sequence of cable frames received over the second communication link so as to extract the first sequence of data frames, and transmitting the first sequence of data frames over the first communication link, wherein encapsulating the first sequence in the second sequence comprises exchanging management data over the second communication link by inserting the management data into the cable frames, and wherein the management data comprises the indications of the ACM settings to be used by the first communication link.

20. The method according to claim 19, wherein the first communication link comprises a wireless link and wherein the second communication link comprises a wireline link.

21. The method according to claim 19, wherein the second link comprises at least one of a coaxial cable, a twisted pair and an optical link.

22. The method according to claim 19, wherein the first and second links comprise wireless links for relaying data between the first and second communication systems via a third communication system.

23. The method according to claim 19, wherein the second communication link connects an indoor unit (IDU) of the first communication system with an outdoor unit (ODU) of the first communication system located adjacent to an antenna of the first communication link.

24. The method according to claim 19, wherein modifying the second data rate comprises refraining from modifying a physical data rate of the second communication link.

25. The method according to claim 24, wherein modifying the second data rate comprises inserting dummy data into the data transmitted over the second communication link so as to modify an effective data rate of the second communication link without modifying the physical data rate of the second communication link.

26. The method according to claim 25, wherein inserting the dummy data comprises determining an amount of the dummy data to be inserted based on a difference between the first data rate and the physical data rate of the second communication link, and inserting fields identifying locations of the dummy data into the data transmitted over the second communication link.

27. The method according to claim 24, wherein communicating over the cascaded connection comprises encoding the data transmitted over the second communication link using an error correcting code (FCC), and wherein modifying the second data rate comprises selecting a code rate of the FCC based on a difference between the first data rate and the physical data rate of the second communication link.

28. The method according to claim 19, wherein communicating over the cascaded connection comprises modulating the data transmitted over the second communication link using a modulation scheme, and wherein modifying the second data rate comprises selecting a symbol constellation of the modulation scheme so as to match the first data rate.

29. The method according to claim 19, wherein communicating over the cascaded connection comprises varying the first data rate by modifying at least one of a modulation scheme and a code rate used for communicating over the first communication link.

30. The method according to claim 29, wherein communicating over the cascaded connection comprises determining a value of the first data rate based on a quality of reception over the first communication link.

31. The method according to claim 30, wherein determining the value of the first data rate comprises predicting future channel conditions of the first communication link and determining the value based on the predicted future channel conditions.

32. The method according to claim 31, wherein predicting the future channel conditions comprises monitoring at least one of a mean square error (MSE), a received signal level (RSL), a bit error rate (BER) and equalizer coefficient values of a receiver of the first communication link.

33. The method according to claim 19, wherein encapsulating the first sequence in the second sequence comprises inserting into the cable frames fields indicating locations of the data frames in the cable frames, and wherein de-capsulating the second sequence of cable frames comprises determining the locations of the data frames based on the fields.

34. The method according to claim 19, wherein modifying the second data rate comprises modifying a physical data rate of the second communication link.

35. The method according to claim 34, wherein modifying the physical data rate of the second communication link comprises determining a modification to the physical data rate of the second communication link based on a difference between the first data rate and the physical data rate of the second communication link.

36. The method according to claim 34, wherein modifying the physical data rate of the second communication link comprises selecting a symbol constellation responsively to the first data rate.

37. A communication network, comprising:
a first communication system, comprising:
a first communication unit, which is arranged to communicate over a first communication link having a first, variable data rate; and
a second communication unit, which is arranged to communicate with the first communication unit over a second communication link having a second data rate; and
a second communication system, comprising:
a third communication unit, which is arranged to communicate with the first communication unit over the first communication link; and
a fourth communication unit, which is arranged to send data to the second communication unit via the first and second communication links by communicating with the third communication unit over a third communication link having a third data rate,
wherein the first, second, third and fourth communication units are arranged to modify at least one of the second and third data rates responsively to variations in the first data rate, so as to match the at least one of the second and third data rates to the first data rate, wherein the first communication unit is arranged to indicate the variations to the fourth communication unit via the second communication unit,
wherein the first communication unit is arranged to indicate the variations in the first data rate to the fourth communication unit, and wherein the fourth communication unit is arranged to initiate a modification of the first data rate and the at least one of the second and third data rates based on the indicated variations.

38. The network according to claim 37, wherein the first communication unit comprises a variable rate modem, which is arranged to assess a quality of reception over the first communication link, and wherein the variations in the first data rate are determined responsively to the assessed reception quality.

39. The network according to claim 37, wherein the first communication unit is arranged to indicate the variations to the fourth communication unit via the third communication unit.

* * * * *